United States Patent [19]

Dmitrowsky

[11] 4,379,532
[45] Apr. 12, 1983

[54] AIRCRAFT ATTACHABLE TO THE BODY OF A PILOT

[76] Inventor: Igor Dmitrowsky, 92-36 54th Ave., Elmhurst, N.Y. 11373

[21] Appl. No.: 199,496

[22] Filed: Oct. 22, 1980

[51] Int. Cl.³ .................... B64C 39/00; B64C 15/02
[52] U.S. Cl. ..................................... 244/4 A; 244/52
[58] Field of Search ............... 244/4 R, 4 A, 234, 52, 244/51, 45 A, 89, 225, 55, 233, 23 A, 12.1; 114/315

[56] References Cited

U.S. PATENT DOCUMENTS

| | | | |
|---|---|---|---|
| 1,765,924 | 6/1930 | Laurenf | 244/4 R |
| 2,757,886 | 8/1956 | Correa | 244/64 |
| 2,995,319 | 8/1961 | Kershner et al. | 244/52 |
| 3,173,629 | 3/1965 | Uhor | 244/4 A |
| 3,258,916 | 7/1966 | Lehmann | 244/52 |
| 3,329,118 | 7/1967 | Strader | 114/315 |
| 3,515,361 | 6/1970 | Blackburn | 244/52 |
| 3,556,438 | 1/1971 | Meditz | 244/4 A |
| 3,580,636 | 5/1971 | Seffo | 244/234 |
| 4,253,625 | 3/1981 | Dmitrowsky | 244/4 A |

FOREIGN PATENT DOCUMENTS 1331882  5/1963  France ..................... 244/4 R

OTHER PUBLICATIONS

"Bell to Test New Flying Belt for Military", *Aviation Week and Space Tech.*, Jul. 22, 1963, p. 65.

*Primary Examiner*—Galen L. Barefoot
*Attorney, Agent, or Firm*—Nicholas J. Garofalo

[57] ABSTRACT

A winged aircraft attachable to the body of a pilot including multiple jet engines whereby it may be propelled into and sustained in flight, having angularly adjustable side fins, having pilot operable controls for simultaneously controlling directional issuance of jet streams issuing from the engines and angular adjustment of the fins, including a support for the head of the pilot, and including a support for his feet.

3 Claims, 5 Drawing Figures

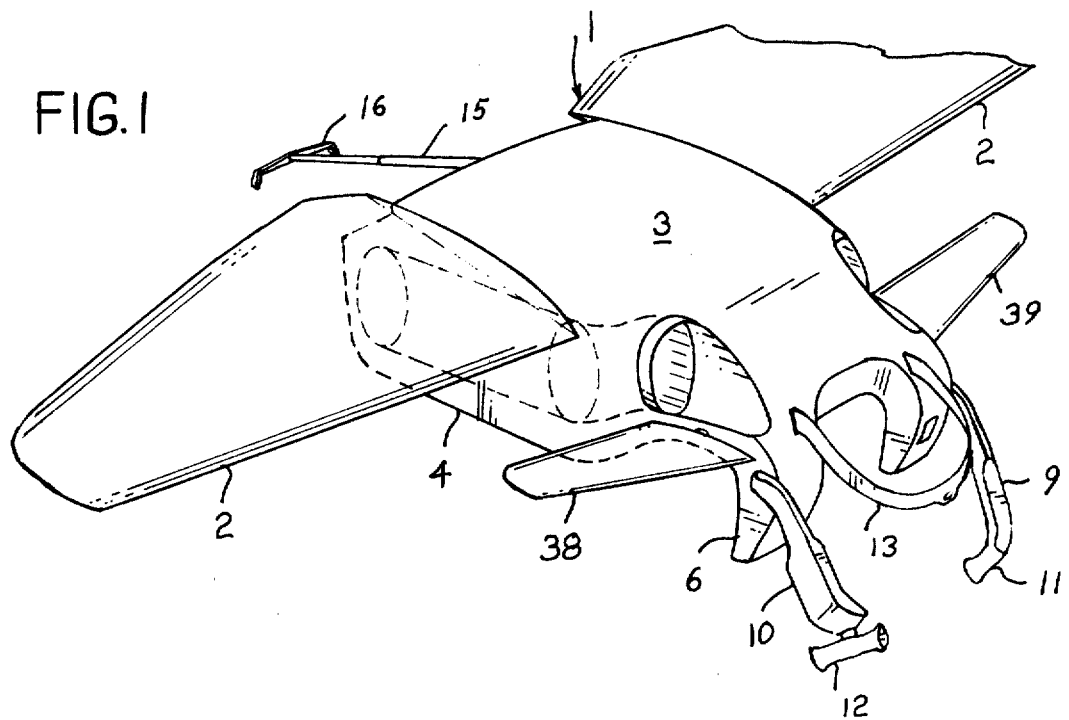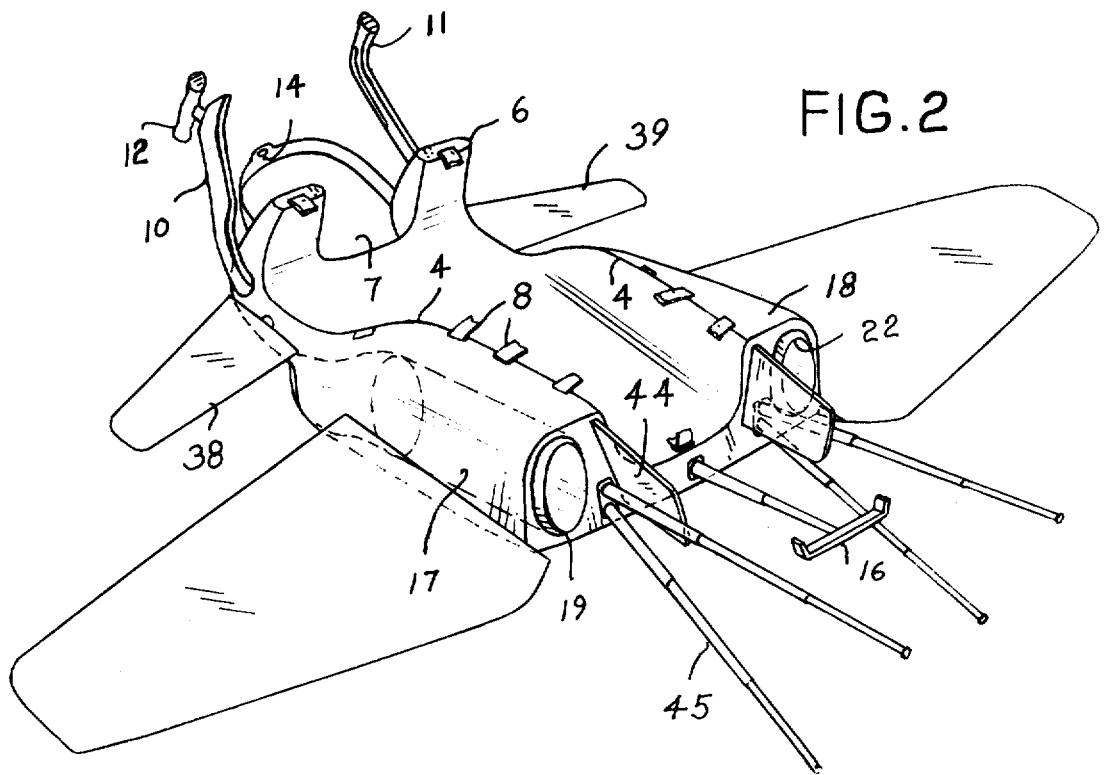

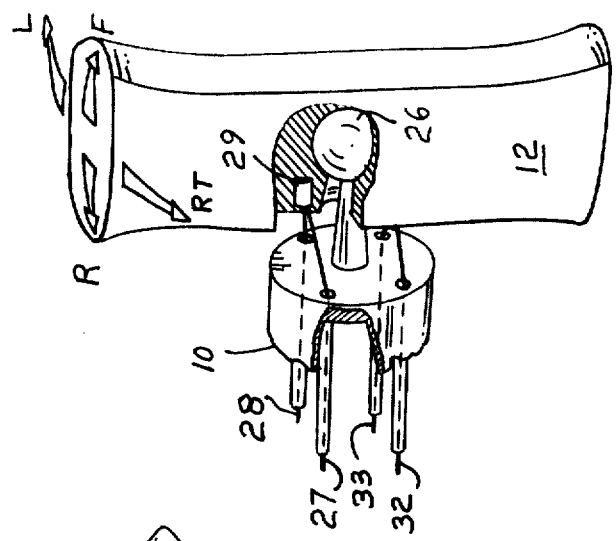
FIG. 3
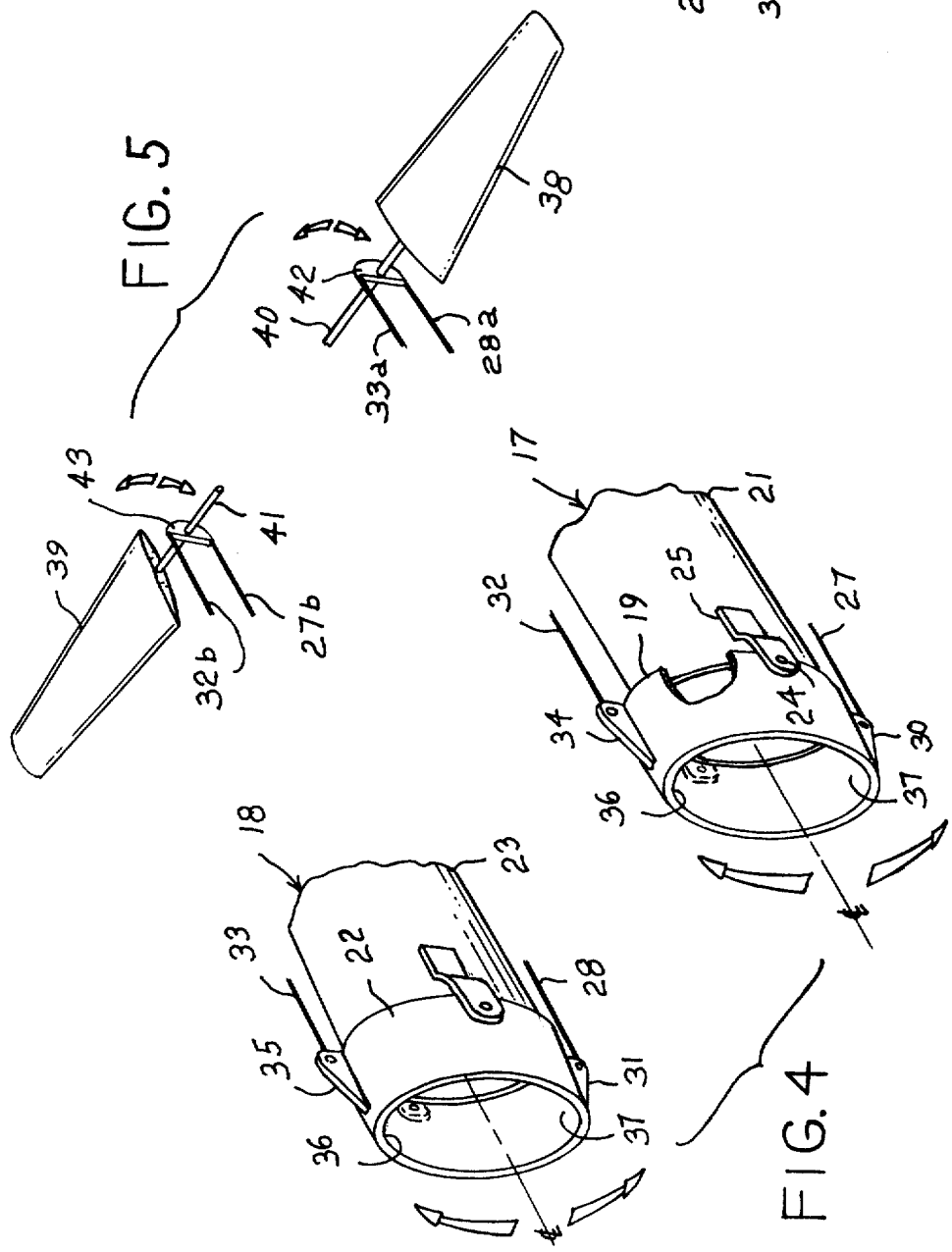
FIG. 5
FIG. 4

4,379,532

AIRCRAFT ATTACHABLE TO THE BODY OF A PILOT

BACKGROUND OF THE INVENTION

This invention is concerned with new and useful improvements in aircraft of a type designed to be harnessed to the body of a pilot and propelled in flight by engine power.

This invention represents a further development in aircraft of this general nature; it constitutes a patentably distinct modification of the aircraft disclosed in my copending application, Ser. No. 074,001, filed Sept. 10, 1979 now U.S. Pat. No. 4,253,625.

Aircraft of this species has advantages over conventional aircraft in that it can go into, ascend from, and land upon relatively small areas, rocky terrain, small islands, sand bars, roof tops, wooded lands and canyon floors. Accordingly, such aircraft provides desirable benefits in sporting, exploratory, emergency aid and warfare action. However, in warfare a type of craft of this nature is desired that has further advantages which are not normally needed in peaceful pursuits. In combat there is needed the capacity to safely make sharp changes in flight direction and greater speed. Further, the craft should have not only the capacity to dive into narrow mountain areas, deep canyons and to near ground levels, but also the capacity to safely rise upward out of such situations without having first landed. The present invention is directed to providing a pilot carried aircraft which has these various advantages for both peaceful as well as warfare use.

SUMMARY OF THE INVENTION

This invention while including many of the features of my copending application provides additional features and advantages. It provides dual engine power and associated manual controls whereby increased flight speed and maneuverability is had. It includes a pair of side fins which supplement the wings in reacting to the air forces acting on the craft in flight. A desirable smoothness and stability is imparted to the craft by the fins in flight. The fins further provide lift benefits which enables substantially U-pattern diving of the craft to close ground levels and lifting up from such levels without mishap. It includes a support or rest for the pilot's head during flight. It has a releasable stand means for positioning the craft in a vertical ground-rest condition, whereby harnessing and removing the craft is facilitated for the pilot. It includes heat guards serving to protectively guard portions of the pilot's body against radiating heat of the engines exhaust gases. It includes suitable life support means subject to the control of the pilot and needed in high altitude flight. These features and the advantages flowing therefrom serve to provide a desireable craft.

The foregoing structure, features and advantages of the invention will become increasingly apparent as this specification unfolds in greater detail, and as it is read in conjunction with the accompanying drawing wherein an embodiment of the invention is shown. However, it is to be expressly understood that the drawing is for purposes of illustration; and it is not to be construed as limiting the scope of the invention.

BRIEF DESCRIPTION OF THE DRAWING

In the accompanying drawing:

FIG. 1 is a perspective view of an aircraft embodying the invention and showing mainly the upper, front and right side areas thereof;

FIG. 2 is a perspective view showing essentially the underareas and rear thereof, and also showing the stand extended out of the body of the craft for standing the craft in an upright position on the ground;

FIG. 3 is a detail view in perspective with portions cut away of the right handgrip and associated control cables;

FIG. 4 is a detail view in perspective showing the collars controlling directional flow of the exhaust streams of the craft's jet engines, and further showing the control cables associated with the right handgrip; and FIG. 5 is a detail in perspective showing the right and left side fins and related control cables.

DETAILED DESCRIPTION OF THE INVENTION

The invention will now be described with reference to the accompanying drawing sufficiently in such clear and concise manner as to enable persons having ordinary skill in this art to make and use the same.

The illustrated aircraft, generally designated 1, includes a pair of wings 2 fixed to opposite side areas of the body 3. Its body is in the form of a saddle, here adapted to be mounted to the back of the pilot so as to engage about his sides and shoulders. To this end its rearward portion is of an inverted U-form having side walls 4 adapted to be positioned at opposite sides of the pilot's body. Its forward portion is designed to overlie the pilot's body adjacent his neck, and is open at the sides to allow for free movement of his arms. The front end defines a yoke having a pair of curved elements 6 adapted to overlie the pilot's shoulders. A space 7 between the curved or shoulder element 6 serves to accomodate the pilot's neck and allows for the forward disposition of his head.

Suitable straps or belts 8, portions of which are shown, are provided for securing the craft in proper position to the body of the pilot.

Elongated arms or handles 9 and 10 extend forwardly, one from each of the shoulder elements 6. Each handle terminates in a separate handgrip 11, 12 adapted to be held by the pilot during flight.

A support 13 for the pilot's head is mounted to the forward end of the craft. Here, it is in the form of a belt or band having a fastener component 14 adapted to be releaseably engaged by a complementary component on the pilot's helmet.

A staff 15 extending rearwardly from the craft has a support 16 for the pilot's feet.

The craft is powered in flight by thrust forces developed by the exhausting jet streams of a pair of jet engines 17 and 18 mounted at opposite side areas of the craft. To this end, the side walls 4 of the saddle are thickened so as to house an engine 17 in each wall.

Suitable means associated with the engines is provided for effecting directional control of the craft in flight. To this end, a collar 19 is pivotedly associated with the exhaust tube 21 of engine 17; and a second collar 22 is similarly associated with the exhaust tube 23 of engine 18. The collars are subject to directional control by the pilot, whereby they are made cooperable with the exhausting jet streams to vary the course of flight as desired.

As best seen in FIG. 4, each collar is tubular and similar in its mounting. Its forward end extends over and in surrounding spaced relation to a marginal end of the related exhaust tube. It is pivoted at opposite points 24 in a pair of supportarms 25 extending from opposite sides of the exhaust tube, so as to permit pivoting of the collar about a lateral axis.

Suitable cables for effecting controlled pivoting of the collars by the pilot relative to the exhaust tubes so as to maneuver the craft in desired directions are connected with the right handgrip 12. For this purpose handgrip 12 is swivelled at its mid-area upon a ball head 26 of a pin fixed in an end of handle 10. A pair of cables 27 and 28, fixed at a common point 29 in the handgrip above the ball head, extend through guide sleeves in handle 10 to the collars. Cable 27 is connected to an ear 30 at the bottom of collar 19; and cable 28 is connected to an ear 31 at the bottom of collar 22. A second pair of cables 32 and 33, fixed at a common point, not shown, in the handgrip below the ball head, extend through guide sleeves in handle 10 to the collars. Cable 32 is connected to an ear 34 at the top of collar 19; and cable 33 is connected to an ear 35 at the top of collar 22.

Upon selective directional swivelling of handgrip 12 the cables cause a desired directional pivoting of the collars relative to the exhaust tubes and to the exhausting jet streams of the engines. This in turn causes the craft to veer in a selected direction.

The several cables have a normal condition, as in FIG. 4, when the handgrip 12 is in its neutral position shown in FIG. 3. In this normal condition the longitudinal axes of the collars coincide with those of the jet exhaust tubes.

When the pilot pivots the handgrip forwardly in the direction of the arrow F, cables 27 and 28 are actuated to cause a corresponding pivoting of the collars to bring the areas 36 of the collars into the paths of the exhausting jet streams.

When the pilot pivots the handgrip rearwardly in the direction of the arrow R, cables 32 and 33 are actuated to cause a corresponding pivoting of the collars to bring the areas 37 of the collars into the paths of the exhausting jet streams.

When the pilot pivots the handgrip to his left in the direction of the arrow L, cable 27 is actuated to pivot the right collar 19 so as to bring its area 36 into the path of the exhausting jet stream of the right engine 17; and cable 33 is actuated to pivot the left collar 22 so as to bring its area 37 into the path of the exhausting jet stream of the left engine 18.

When the pilot pivots the handgrip to his right in the direction of the arrow RT, cable 28 is actuated to pivot the left collar 2 to bring its area 36 into the path of the exhausting jet stream of the left engine 18; and cable 32 is actuated to pivot the right collar 19 to bring its area 37 into the path of the exhausting jet stream of the right engine 17.

It can be seen that accordingly as the handgrip 12 is directionally pivoted from its neutral position the collars may be pivoted to selected angular positions about their lateral axes relative to the exhausting jet streams of the engines. This causes impingement of the forcefully exhausting jet streams against particular inner surface areas of the collars and consequent rotation of the craft in a desired direction about its vertical or lateral axis. Ascending and descending actions of the craft will be controlled by the pilot accordingly as he pivots the handgrip forwardly or rearwardly; and turning actions of the craft to the right or left will be controlled accordingly as the pilot pivots the handgrip to his right or left.

A pair of angularly adjustable fins 38 and 39 extend laterally from opposite sides of the forward area of the body of the craft. The right fin 38 is carried by a shaft 40 rotatively mounted in the craft to define a lateral axis; and the left fin 39 is carried by a separate shaft 41 similarly mounted in the craft. The fins serve to provide various benefits which add to the flight performance of the craft, as will be apparent to those skilled in this art when considering the nature of the fins and their mode of operation.

The fins are operatively connected with the collar control cables earlier mentioned, so that the fins can be automatically pivoted or adjusted angularly in one direction or the other about their lateral axes in response to pivoting of the handgrip 12. To this end, separate half-moon discs 42 and 43 are fixed one upon each shaft. Cables 33a and 28a controlling the right fin 38 respectively connect opposed points of disc 42 with the control cables 33 and 28 of the left collar 22. And cables 32b and 27b controlling the left fin 39 respectively connect opposed points of disc 43 with the control cables 32 and 27 of the right collar 19.

The interconnected cable system or arrangement is such that with each selected operation of handgrip 12 each fin is caused to pivot about its axis in a direction counter or inversely to that in which the related cable connected collar is caused to pivot.

As an illustration of the relative pivoting of the collars and fins, reference is directed to FIGS. 3–5. When handgrip 12 is pivoted in the direction of the arrow F, cables 27 and 28 pivot both collars counter-clockwise, as cable 27b pivots the left fin 39 clockwise and cable 28a pivots the right fin 38 clockwise. As a further illustration, when the handgrip is pivoted in the direction of the arrow RT, cable 28 pivots the left collar 22 counter-clockwise as cable 28a pivots the right fin 38 clockwise; and cable 32 pivots the right collar clockwise as cable 32b pivots the left fin 39 counter-clockwise.

If desired, a tail piece may be mounted to the craft in suitable manner.

A pair of heat guards 44 disposed in laterally spaced relation to each other extend rearwardly of the body of the craft so as to be located one to each side of rearwardly projecting portions of the pilot's body. They serve to protect the pilot from the heat of the exhausting jet streams.

Means is provided for standing the craft in a vertical position on the ground so as to facilitate harnessing and unharnessing the craft relative to the body of the pilot. Here, this stand means takes the form of a group of legs 45. Each leg is formed of telescoped sections; and each leg is adapted to be telescoped into or out of the body of the craft as needed.

The craft further includes suitable life support means, not shown, which is available to the pilot when needed in high altitude flight.

While an embodiment of the invention has been illustrated and described in detail, it is to be expressly understood that the invention is not limited thereto. Various changes of form, design or arrangement may be made in its components without departing from the spirit and scope of the invention. It is my intent, therefore, to claim the invention not only as shown and described but also in all such forms and modifications or equivalents thereof as might be construed to be within the spirit of the invention when considered in the light of the specification, the drawings, and the appended claims.

What is claimed is:

1. An aircraft attachable to the back of a pilot located externally of the aircraft, the aircraft comprising: a saddle defining a main portion of the aircraft, the saddle being adapted to be seated and secured upon the back of the pilot; a pair of shoulder elements offset from a forward end of the saddle adapted to front the shoulders of the pilot; a pair of wings extending one from each side of the saddle; a pair of fins extending one from each side of the saddle in forwardly spaced relation to the wings, each fin having an axis of rotation; control means for actuating the fins about their axes; support means extending rearwardly from the saddle engageable by the pilot's feet; a pair of handles extending forwardly from the saddle terminating in a pair of handgrips engageable by the pilot; the saddle defining a pair of thick laterally spaced side walls; a pair of engines housed one in each side wall, each engine having a rearwardly disposed propulsive exhaust tube and flight direction control elements pivotable relative to the exhaust tubes for deflecting exhaust streams in selectable directions; and means operatively associating the flight direction control elements and the control means for actuating the fins about their axes with at least one of the handgrips.

2. A winged aircraft comprising a saddle form aircraft body adapted at its exterior underside to be mounted upon and secured to the back of a pilot; multiple engines housed in the aircraft body having exhaust tubes opening through the rear of the aircraft body for issuing propulsive streams to propel and sustain the aircraft in flight; angularly adjustable fins projecting from opposite sides of the aircraft body for effecting selectable flight patterns; the exhaust tubes having terminal elements relatively pivotable to deflect issuing propulsive streams in selectable directions; pilot operable control means connected with the fins and the terminal elements for effecting simultaneously selective pivoting of the terminal elements and angular adjustment of the fins, the pilot operable control means including a handgrip swivelled to a handle for movement in selectable directions, and a plurality of control cables connecting the fins and the terminal elements with the handgrip; and the aircraft body having laterally spaced walls in each of which one of the engines is housed.

3. A winged aircraft as in claim 2, wherein the aircraft body comprises a saddle of inverted U-form having an upper bridge portion adapted to overlie the pilot's back, the laterally spaced side walls are adapted to be positioned at opposite sides of the pilot's body, a pair of wings extending from opposite sides of the saddle in rearwardly spaced relation to the fins, a semi-circular band extending forwardly from the saddle adapted for engagement with a helmet of the pilot, a crossed stick extending rearwardly from the saddle engageable by the feet of the pilot, a pair of handles extending forwardly from the saddle terminating in handgrips engageable by the pilot, means telescopically extendable from a rear end of the saddle for standing the aircraft upon a ground surface, and a pair of shoulder elements offset from a forward end of the saddle adapted to front the pilot's shoulders.

* * * * *